Figure 1:
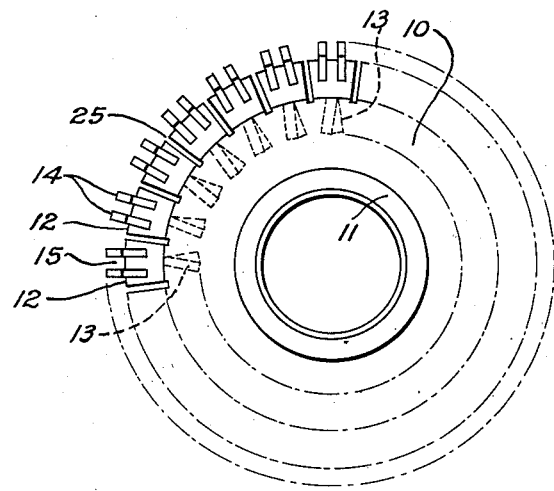

March 11, 1958  B. CAMPRUBI  2,826,707
COMMUTATORS FOR DYNAMO-ELECTRIC MACHINES
Filed April 12, 1955  2 Sheets-Sheet 1

United States Patent Office 2,826,707
Patented Mar. 11, 1958

2,826,707

COMMUTATORS FOR DYNAMO-ELECTRIC MACHINES

Bartholomew Camprubi, Perivale, England, assignor to The Hoover Company, North Canton, Ohio, a corporation of Ohio Application April 12, 1955, Serial No. 500,901

2 Claims. (Cl. 310—234)

The instant invention relates to commutators for dynamo-electric machines, and more particularly to a novel commutator and the method of forming that commutator, including a novel construction of the commutator segments for facilitating attaching connecting wires to the commutator segments.

In armatures of low rating, that is, of relatively low voltage and high current, the connecting wires leading to the commutator are relatively thick and, accordingly, require a more substantial construction of the commutator segments for securing these wires to the commutator. Hitherto, it has been customary in constructing armatures of low rating to make the commutator segments of increased thickness in order to accommodate the relatively thicker connecting wires and to insure a secure connection of the wires to the commutator segments. The provision of the relatively thicker commutator segments to insure connection of the wires thereto is an undesirable expedient, especially from the standpoint of economy.

In accordance with the instant invention, there is provided a novel commutator construction which is particularly adapted to insure a positive connection of the connecting wires to the commutator segments. The method of manufacturing the commutator of the instant invention includes offsetting, as by a punching operation, a portion of each commutator segment to provide a pair of tongues on each segment projecting outwardly of the face thereof. There is thus formed a slot on the commutator segment into which a connecting wire may be placed for securing the same thereto. The commutator so constructed requires no increase in the amount of material used and insures that the connecting wires will be properly secured to the commutator segments.

It is, accordingly, a prime object of this invention to provide a novel commutator construction for facilitating and insuring proper connection of the connecting wires to the commutator segments.

It is a further object of the instant invention to provide a novel commutator construction in which each commutator segment includes tongues offset from the brush contacting surface of the commutator segments, said tongues providing slots for the reception of the connecting wires to insure proper connection of said wires to the commutator segments.

It is also an object of the instant invention to provide a novel method of manufacturing a commutator for dynamo-electric machines in which portions of the commutator segments are offset from the brush contacting surface thereof to provide tongues for securing the connecting wires to the commutator segments.

Figure 2:
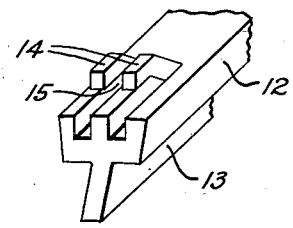
Figure 3:
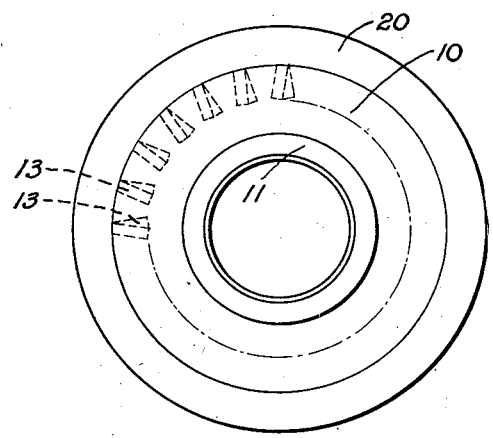
Figure 4:
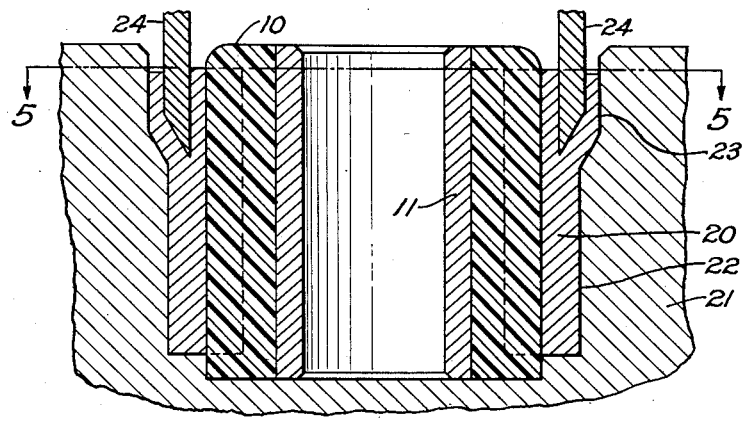
Figure 5:
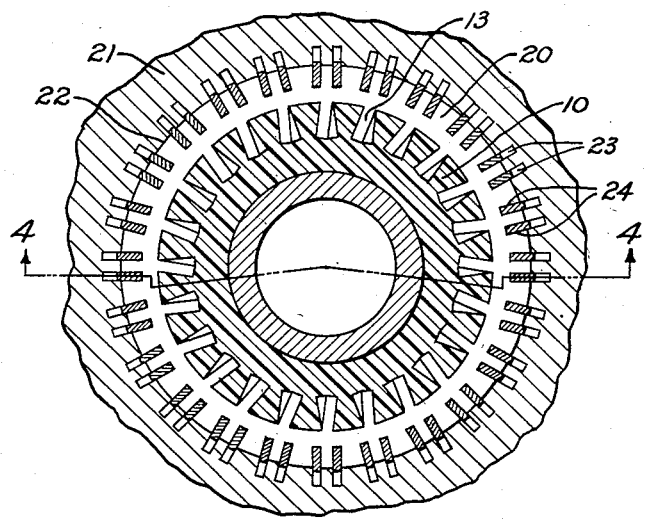
Figure 7:
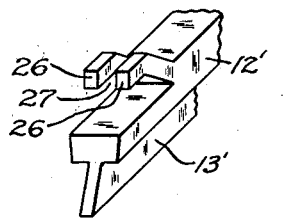
Figure 6:
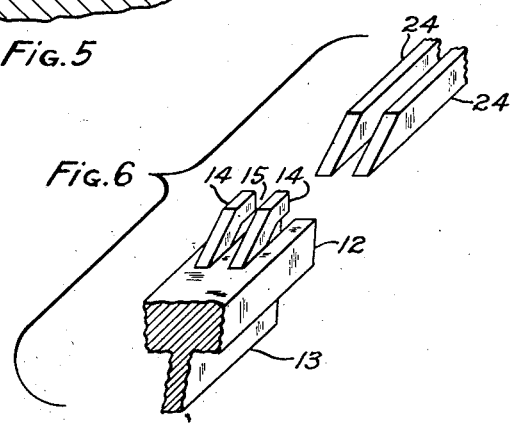

Further objects and advantages of the instant invention will appear to those skilled in the art from a consideration of the detailed description of several preferred embodiments of the invention which follows, reference being had to the drawings in which:

Figure 1 shows a commutator constructed in accordance with the instant invention, Figure 2 is a perspective view of a commutator segment constructed in accordance with the instant invention, Figure 3 shows an initial step in the manufacture of the novel commutator, Figure 4 is a sectional view on the line 4—4 in Figure 5 showing the formation of the offset tongues on the commutator segments, Figure 5 is a sectional view on the line 5—5 in Figure 4, Figure 6 is an exploded view of the novel commutator segment and the punches for forming the offset tongues, and Figure 7 illustrates a modified form of the commutator segments constructed in accordance with the instant invention.

The commutator of the instant invention is illustrated in Fig. 1 and comprises a cylindrical supporting core 10 within which there is secured a bushing 11 which is adapted to be press fitted onto the shaft of the armature for mounting the commutator. A plurality of commutator segments 12 are secured to the periphery of the supporting core 10 providing the usual brush contacting surfaces arranged concentrically with the armature shaft. A radial rib 13 is integral with each of the commutator segments 12 and projects radially therefrom into the supporting core 10. The ribs 13 are preferably twisted along their lengths to positively secure the commutator segments to the surface of the supporting core 10.

Each of the commutator segments 12 is provided with a pair of tongues 14 offset from the brush contacting surface of the segments and projecting radially of the commutator. The tongues 14 provide a slot 15 between the adjacent faces thereof within which a connecting wire may be placed for the application of solder to the end of the commutator segment for making a final connection of the wire to the commutator segment. By virtue of the construction of the novel commutator of this invention, it is possible to accommodate the thicker wires required by armatures of low rating without increasing the thickness of the commutator segments. After the armature has been wound and the commutator assembled, the connecting wires may be placed in position within the slots 15 formed by the tongues 14 for the application of the solder to finally connect the wires to the commutator.

The commutator of Fig. 1 is manufactured by forming a ring of commutator material 20 with twisted ribs 13 projecting radially from the inner surface thereof. The ring 20 is then placed within a cylindrical mold which supports the outer surface thereof. A bushing 11 is supported in the mold concentrically with the ring 20. A thermosetting material is then placed in the mold between the facing surfaces of the ring 20 and the bushing 11. Heat and pressure are applied to the thermosetting material to form the supporting core 10 with the ribs 13 embedded therein securing the ring of commutating material 20 to the surface of the core. The bushing 11 is preferably formed with a knurled surface, ribs, or the like, for positively anchoring it within the supporting core 10.

After the molding operation is completed, any excess of the molding material may be removed, and the supporting core 10 trimmed to its final dimensions. The ring of commutating material 20 is also machined at this time to reduce it to its final diameter. The commutator is then placed in a die 21 having a cavity 22 complementally formed with respect to the commutator to securely hold it therewithin. The cavity 22 includes a series of recesses 23 adjacent the top thereof for a purpose to be described. The recesses 23 are arranged in pairs around the circumference of the mold cavity 22, each pair being aligned with one of the ribs 13.

A gang of chisel shaped punches 24 is arranged in a circle concentric with the commutator. Each of the punches 24 is aligned with a recess 23 and is complementally formed with respect thereto. The punches 24 are mounted on a suitable ram, or the like, for reciprocating them relatively to the mold cavity 22 on a line parallel to the axis thereof.

The tongues 14 on the commutator segments 12 are formed by depressing the punches 24 relatively to the mold cavity 22 forcing the punches into the end of the ring 20, whereby some of the material of the ring 20 is split and pressed into the recesses 23. The punches 24 are then withdrawn from the mold cavity 22, and the commutator removed from the mold.

The ring of commutator material 20 is then sawed in a direction parallel to its axis between the pairs of projecting tongues 14, forming slots 25 extending parallel to the axis of the commutator. The slot 25 is cut completely through the ring 20 to a slight depth into the supporting core 10 for completely segregating the individual commutator segments. It will be seen that each of the commutator segments so formed includes a rib 13 projecting into the supporting core 10 for securely anchoring the segments thereto.

The ends of each of the commutator segments, formed as above described, include a pair of radially projecting tongues 14 offset from the brush contacting surface thereof and providing a slot between the adjacent faces of the tongues 14 within which the connecting wires may be placed to solder them to the commutator segments. In cases where the wire diameter is large enough, it may be possible to eliminate the soldering operation by pinching the connecting wires under the projecting tongues and make a cold pressure welded joint for securing the wires to the commutator segments.

In a modified form of the instant invention, the commutator segments may be formed as illustrated in Fig. 7. In this modification of the invention, the end of the commutator segment 12' is offset, as by a splitting operation with a punch across its full width. The wide tongue so formed is then sawed through longitudinally of the commutator's segment to provide a pair of individual tongues 26 with a slot 27 formed between the adjacent faces thereof. A connecting wire may be laid within the slot 27 in the manner previously described, and solder applied to make a final connection of the wire to the commutator segment. If the wire diameter is large enough, it may be secured to the commutator segment by pinching it under or between the projecting tongues 26 to make a cold pressure welded joint.

The instant invention in commutators for dynamo-electric machines has been described as embodied in several preferred forms which are illustrative of the invention. Modifications thereof falling within the scope of the invention will occur to those skilled in the art, and accordingly, it is not intended that the invention be limited except as set forth in the claims which follow.

I claim:

1. A commutator comprising, a supporting core, a ring of commutator segments anchored to said core, a pair of spaced tongues struck up from the material of each of said segments at one end thereof leaving the material of said segments between said tongues intact so as to form lands between said tongues, the space between each pair of tongues forming a space for receiving connecting wires and said lands forming supports upon which said connecting wires may rest while being soldered to said tongues.

2. The method of making a commutator comprising, anchoring a ring of commutating material to a supporting core, displacing the material of one end of said ring radially outwardly from the outer surface of said ring at spaced points about its periphery to form a plurality of spaced tongues about the periphery of one end of said ring and radially spaced from its surface while leaving the material of said ring between said tongues intact and dividing said ring longitudinally to form a plurality of commutator segments with a pair of said tongues attached to each segment.

References Cited in the file of this patent

UNITED STATES PATENTS

| 702,272 | Windle | June 10, 1902 |
| 1,757,393 | Schmid | May 6, 1930 |
| 2,476,795 | Avigdor | July 19, 1949 |
| 2,535,825 | Wahlberg | Dec. 26, 1950 |

FOREIGN PATENTS

| 15,662 | Great Britain | of 1912 |